(12) United States Patent
Luken (10) Patent No.: US 6,421,060 B1
(45) Date of Patent: Jul. 16, 2002

(54) MEMORY EFFICIENT SYSTEM AND METHOD FOR CREATING ANTI-ALIASED IMAGES

(75) Inventor: William L. Luken, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,813

(22) Filed: Mar. 31, 1999

(51) Int. Cl.[7] ................................................ G09G 5/00
(52) U.S. Cl. ........................................ 345/611; 345/619
(58) Field of Search ................................ 345/136, 137, 345/132, 429; 382/266, 267, 268, 269

(56) References Cited

U.S. PATENT DOCUMENTS

| 5,600,773 A | * | 2/1997 | Vanover et al. | 395/173 |
| 5,748,946 A | | 5/1998 | Schneider | 395/501 |
| 5,864,342 A | * | 1/1999 | Kajiya et al. | 345/418 |
| 5,940,080 A | * | 8/1999 | Ruehle et al. | 345/432 |
| 5,977,977 A | * | 11/1999 | Kajiya et al. | 345/418 |
| 6,083,162 A | * | 7/2000 | Vining | 600/407 |
| 6,115,050 A | * | 9/2000 | Landau et al. | 345/433 |
| 6,151,030 A | * | 11/2000 | DeLeeuw et al. | 345/435 |

* cited by examiner

Primary Examiner—Kent Chang
Assistant Examiner—Nitin Patel
(74) Attorney, Agent, or Firm—F.Chau&Associates,LLP (57) ABSTRACT

In accordance with the present invention, a program storage device readable by machine, tangibly embodying a program of instructions executable by the machine to perform method steps for creating anti-aliased images and/or a method for creating anti-aliased images includes the steps of providing a subject to be rendered, defining an output resolution of a complete image to be generated by rendering the subject, dividing the complete image into a number of image portions, the number of image portions being determined by an anti-aliasing quality, each image portion having a number of pixels determined by the output resolution of the complete image and the number of image portions, processing the complete image by traversing the subject multiple times to create an intermediate image for each image portion, the intermediate image having a greater number of pixels than the image portion, determining each pixel within the image portion by averaging over blocks of pixels in the intermediate image and combining the image portions to generate the complete anti-aliased image with the output resolution. A system for creating the image is also included.

23 Claims, 4 Drawing Sheets

MEMORY EFFICIENT SYSTEM AND METHOD FOR CREATING ANTI-ALIASED IMAGES

BACKGROUND OF THE INVENTION

1. Field of the Invention

The present invention relates to video images, and more particularly to anti-aliased images provided by a memory efficient system and method.

2. Description of the Related Art

A common operation in the field of computer graphics is the creation of an image based on a representation of the boundaries of numerous 2 dimensional (2d) or 3 dimensional (3d) objects. An image is typically defined by a rectangular array of picture elements (pixels), either in a file, a data structure in the memory of a computer, or a set of rows and columns on a display device or printer. Numerical values associated with each pixel define the color assigned to the corresponding row and column of the image. The numerical values associated with each pixel in an image are determined by establishing which pixels are required to represent each member of a set of 2d or 3d drawing primitives such as vectors, triangles, or polygons. The process of determining the addresses (rows and columns) and numerical values (such as colors) of the pixels associated with a drawing primitive is called rasterizing the primitive.

The set of drawing primitives used to create an image is called a scene or a model. The process of generating an image for a particular scene or model is called rendering the scene or model. The process of rendering a scene or model is accomplished by rasterizing each of the drawing primitives in the scene or model.

Figure 1:
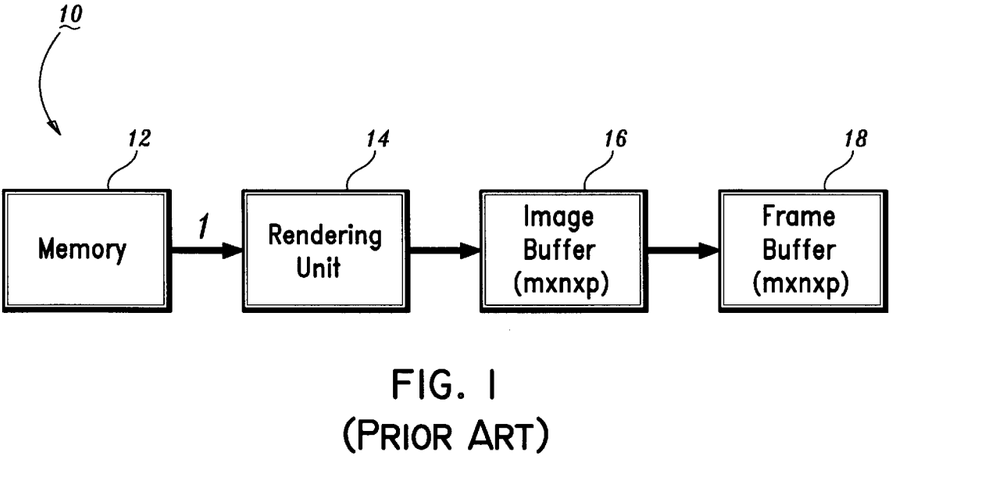
FIG. 1 is a block diagram of an apparatus for creating a computer generated image in accordance with the prior art.

Referring to FIG. 1, an apparatus 10 for creating such an image is shown. This includes a memory 12 for storing a boundary representation of a model or scene, a rendering unit 14, an image buffer 16, and a frame buffer 18. The rendering unit 14 includes one or more processors capable of determining the addresses and color values of all pixels associated with each component of the scene or model. The image buffer 16 is a memory with a capacity of at least m×n×p bytes, where m is a number of rows in the generated image, n is the number of columns, and p is the number of bytes required to represent each pixel. The frame buffer 18 may be a special memory associated with video digital-to-analog converters (DACs) which produce a visible representation of the image on a cathode ray tube (CRT). In some cases, the frame buffer 18 may be a data file or other data structure. In some cases, the image buffer 16 and frame buffer 18 may be the same physical memory.

Figure 2A:
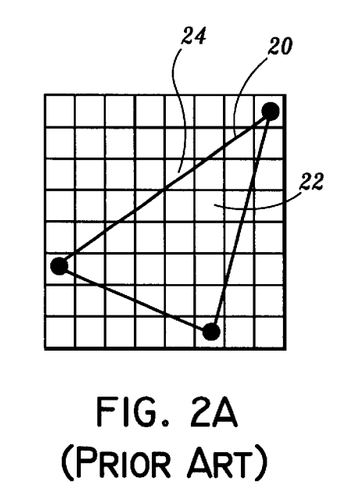
FIG. 2A depicts an outline of a triangle over squares representing pixels.

Referring to FIG. 2A, when a primitive such as a triangle 20 is rasterized, there are typically a number of pixels 22 on the interior of the triangle which are completely covered by the triangle. Other pixels 24 located on the boundary of the primitive, however, may be only partly covered by the primitive.

Figure 2B:
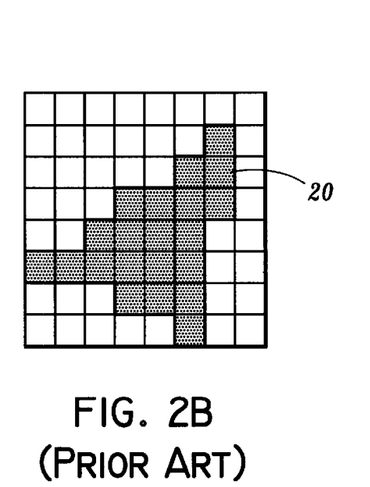
FIG. 2B depicts a representation of the triangle of FIG. 2A with a set of pixels in accordance with the prior art.

In the simplest case, the process of rasterizing a drawing primitive associates pixels with the primitive on an all or nothing basis. For example, if the center of a particular pixel lies within the area of a particular drawing primitive, then the color of that pixel is determined exclusively by that primitive, and other drawing primitives, which may also partially cover the same pixel, are ignored. The result of associating pixels with drawing primitives on an all or nothing basis results in jagged lines along the boundary of a primitive, as shown in FIG. 2B. These jagged boundaries in an image are an undesirable artifact known as aliasing. Techniques for avoiding these artifacts are known as anti-aliasing techniques.

Figure 3A:
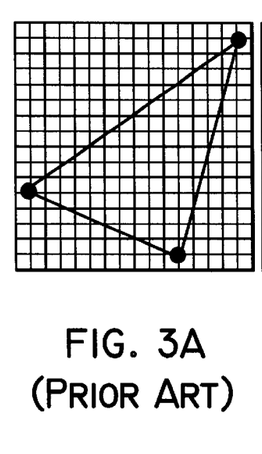
FIG. 3A depicts an outline of a triangle over squares representing higher resolution pixels.
Figure 3B:
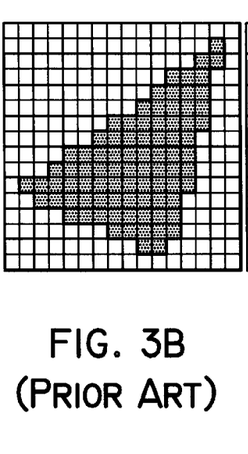
FIG. 3B depicts a representation of the triangle of FIG. 3A with a set of pixels in accordance with the prior art.
Figure 3C:
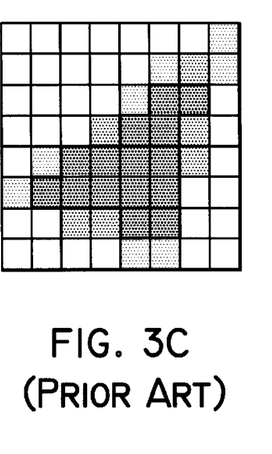
FIG. 3C depicts a representation of the triangle of FIG. 3B with a set of pixels having different shading to represent locations of the pixels being inside, outside or on the boundary of the triangle in accordance with the prior art.

The problem of aliasing may be diminished by super-sampling in which the color of a pixel is determined by a number of points within the area of the pixel instead of representing the pixel by its center. This could be accomplished by using conventional rendering and rasterization techniques to generate a super-image as shown in FIGS. 3A and 3B. Instead of generating an image with m rows and n columns, an image i×m rows and j×n columns is generated, where i and j are the super-sampling factors. After the super-image has been completed, each i×j block of pixels in the super-image is averaged to determine one pixel in the final m×n anti-aliased image. The color of each pixel in the resulting image reflects the portions of the pixel covered by each drawing primitive, as shown in FIG. 3C.

Figure 4:
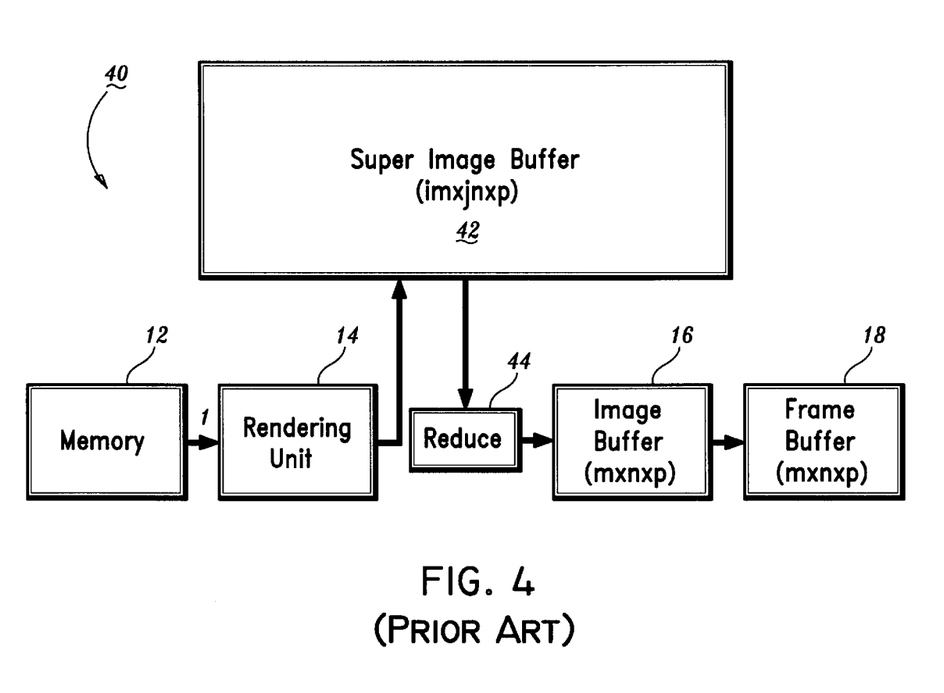
FIG. 4 is a block diagram of an apparatus for superimage anti-aliasing in accordance with the prior art.

Referring to FIG. 4, an apparatus 40 required to create an anti-aliased image with the super-image method is shown. In addition to the components of the conventional apparatus shown in FIG. 1, this apparatus has a super-image buffer 42 and an image reduction unit 44. The image reduction unit 44 determines one pixel in the image buffer 16 based on the average value for each i×j block of pixels in the super-image buffer 42.

The principal problem with the super-image technique is the massive amount of memory required to hold the super-image. A conventional image with a resolution of 600 rows, 800 columns, and 3 bytes per pixel requires nearly 1.5 Mbytes. Super sampling this with factors of i=j=4 would require 16 times as much memory, or roughly 24 Mbytes. If i=j=16, then 256×1.5 Mbytes of memory would be required. In order to implement this in hardware, it would be necessary to provide sufficient real.memory to support the worst case. This would either impose a low upper limit to the super sampling factors, or require providing massive amounts of memory which would be rarely used.

Figure 5:
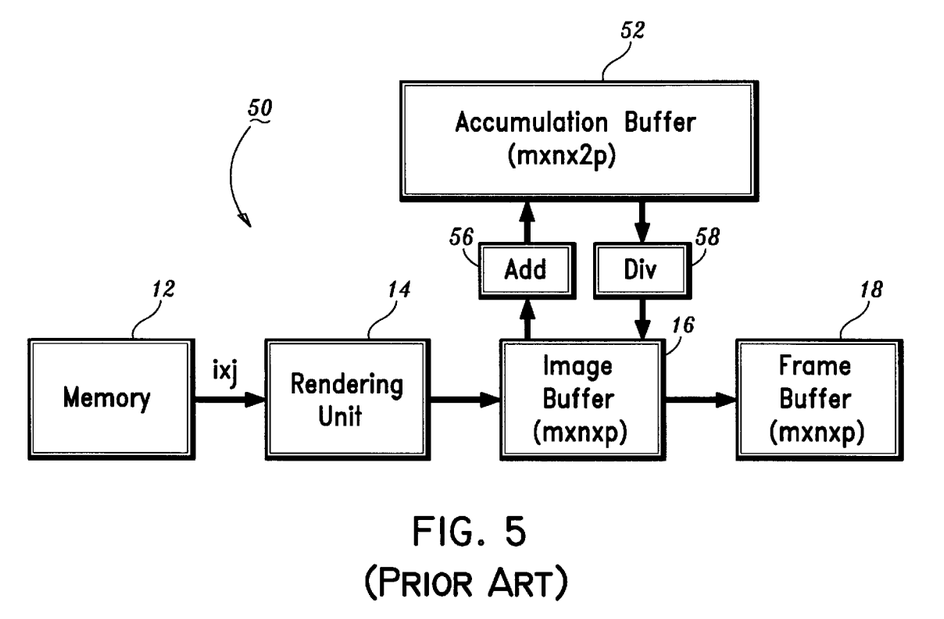
FIG. 5 is a block diagram of an apparatus for creating an image with an accumulation buffer in accordance with the prior art.

Referring to FIG. 5, an alternative apparatus 50 for generating an anti-aliased image is the use of an accumulation buffer 52. In this case, a conventional m×n image buffer with e.g., 8-bits for each color value is supplemented with a second m×n buffer having 16-bits for each color buffer.

The accumulation buffer 52 is initially cleared to all zeroes. Then the entire scene is rendered into the first buffer i×j times, shifting the entire image by multiples of (1/i) rows and (1/j) columns each time. In effect, each rendering pass determines the pixel values determined by every ith row and every jth column of the super-image.

After each rendering pass, the contents of the image buffer 16 are added (block 56) to the contents the accumulation buffer 52. After completing all i×j passes, each color value in the accumulation buffer 52 is divided (block 58) by i×j, truncated to an 8-bit integer, and copied back to the image buffer 16. This allows an image to be sampled with up to 256 samples per pixel using only a fixed modest amount of memory beyond that required by the original image buffer 16. One drawback of this is that the entire image must be rendered many times resulting in a severe performance penalty.

The "accumulation buffer" method may be summarized as follows:

step b1. Create a digital model of the object(s) or scenery to be rendered.

step b2. Decide on the resolution of the image to be generated by the rendering process (for example, this may be 640×480, 1280×1024, etc.).

step b3. Traverse the digital model many times. Clipping boundaries are shifted by a fraction of a pixel on each traversal, and each traversal produces a complete image at the full resolution. For example, the model may be traversed 16 times corresponding to shifting the horizontal and vertical clipping boundaries by ($-\frac{3}{8}$, $-\frac{1}{8}$, $+\frac{1}{8}$, and $+\frac{3}{8}$) pixel.

step b4. On each traversal, each element of the model is processed. That is, the geometry processing is performed and then the results of the geometry processing are immediately passed on to the rasterization processing. This is fully compatible with standard hardware accelerators for 3d graphics.

step b5. The image created in step b4 is added into a special buffer called an "accumulation buffer". An accumulation buffer is similar to an ordinary image buffer, except that the accumulation buffer has 16 bits for each component (r, g, b, and possibly alpha) of each pixel. Each of these components is also called a "sample". The accumulation buffer is not compatible with standard image buffers because it requires 16-bits per sample step b6. After completing the final traversal, the final image is calculated by dividing each 16-bit component of the accumulation buffer by the number of traversals. The results are stored in a standard image buffer.

Another technique has been implemented by Pixar™ Corp. and forms a major part of their Photorealistic Renderman product. The Pixar™ algorithm divides the work of the rendering unit into two stages, a transformation and clipping stage, and a rasterization stage. The output image is divided into many small blocks. The scene or model is passed to the first stage of the rendering unit only once. Each drawing primitive is transformed and assigned to one or more buckets based on the screen blocks touched by the primitive. After the last element of a scene of model has been processed by the first stage of the rendering unit, the second stage of the rendering unit is used to process each of the buckets created by the first stage. The contents of each bucket are processed with a super-image technique applied to a small part of the complete image. The resulting super-image is reduced to a small image which forms one block in the final anti-aliased image.

One drawback to the Pixar™ algorithm is the need to store a copy of the scene or model between the two stages of the rendering process. The amount of storage needed for this copy of the model cannot be bounded and can be very large for complex models.

Pixar™ uses a rendering algorithm that they call "REYES" (Render Everything You Ever Saw). This is incorporated in their product called "PhotoRealistic RenderMan". This algorithm is summarized below. Before the Pixar™ algorithm is examined, first consider the "standard" 3d rendering algorithm for reference. The "standard" 3d rendering algorithm may be summarized as:

step s1. Create a digital model of the object(s) or scenery to be rendered. This is a collection of geometrical primitives, material properties, light sources, transformation matrices, etc. which define the properties of the object(s) or scenery.

step s2. Decide on the resolution of the image to be generated by the rendering process (for example, this may be 640×480, 1280×1024, etc.).

step s3. The digital model is "traversed", meaning that each element is selected and processed in sequence.

step s4. The processing of each geometric element consists of two stages: "geometric processing", and "rasterization". Both stages are performed in turn for each element of the digital model. That is, for each element, the geometric processing is performed. The results of the geometric processing of this element are then immediately used as input for the rasterization process for the same element. The results of the rasterization process are used to update the image defined in step s2. The results of the geometric processing are discarded after being used as input to the rasterization process.

Note that the "geometric" processing includes transformations, lighting, perspective projection, and clipping the results to the "viewing frustum" defined by the view direction and field of view chosen for this image.

The "rasterization" processing includes identifying a set of individual pixels associated with a given geometric element in the target image, along with a color value and possibly a transparency value for each of these pixels.

One advantage of the standard algorithm is that it is not necessary to save the intermediate results determined by the geometry processing. These values are fed directly to the rasterization step and then discarded.

The Pixar™ algorithm may be summarized as:

step p1. Create a digital model of the object(s) or scenery to be rendered. This is the same as in step s1.

step p2. Decide on the resolution of the image to be generated by the rendering process (for example, this may be 640×480, 1280×1024, etc.). Same as step s2.

step p3. Divide the image defined in step p2 into a large number of small squares. These are typically assigned a size of 32×32, but these could be larger or smaller. A data structure called a "bucket" is created for each of the blocks comprising the complete image. (This is a new step not found in the standard algorithm)

step p4. The digital model is "traversed", meaning that each element is selected and processed in sequence. This is equivalent to step s3.

step p5. Perform the geometry processing for each element of the digital model encountered in step p4. The results of this process are used to determine which bucket(s) is/are affected by each element of the digital model. Each affected bucket is updated to reflect the results of the geometry processing. The geometry processing performed in this step is equivalent to the geometry processing performed in step s4 of the standard algorithm. No rasterization processing is performed in step p5. Each element is expected to affect only a few buckets.

step p6. After completing the traversal of the digital model, each of the buckets is examined to determine which elements of the digital model affect each block of image pixels. In most cases, only a few elements of the complete model are expected to be associated with each bucket. These may be sorted by depth and rasterized to determine the colors of each pixel in the small block of pixels associated with each bucket.

step p7. Each block processed in step p6 block may optionally (and typically) be rasterized at a resolution greater than the size of the block defined in step p3. For example, if each block has the size of 32×32, then it may be rasterized at a resolution such as 128×128. The resulting 128×128 image is then reduced to 32×32 by averaging blocks of pixels within the 128×128 image. This produces an anti-aliased image.

step p8. The results of rasterizing each bucket (i.e., a block of pixels) are copied into the corresponding portion of the final image. The final image is completed when the last bucket is processed.

Unlike the standard algorithm, this algorithm requires saving all of the intermediate results of the geometry processing. These results are stored in the array of buckets defined in step p3. This array of buckets may require a large amount of space. This storage requirement is a significant disadvantage. On the other hand, each of the buckets may be processed independently, making this very amenable to parallel processing.

The Pixar™ algorithm is incompatible with typical hardware accelerators for 3d graphics because devices do not allow the results of the geometry processing to be captured and saved into any kind of persistent data storage. These devices assume and require the results of the geometry processing to be passed immediately and directly to the rasterization stage as seen in the standard algorithm.

Therefore, a need exists for a system and method which utilize memory more efficiently for creating and rendering anti-aliased images.

SUMMARY OF THE INVENTION

In accordance with the present invention, a program storage device readable by-machine, tangibly embodying a program of instructions executable by the machine to perform method steps for creating anti-aliased images and/or a method for creating anti-aliased images includes the steps of providing a subject to be rendered, defining an output resolution of a complete image to be generated by rendering the subject, dividing the complete image into a number of image portions, the number of image portions being determined by an anti-aliasing quality, each image portion having a number of pixels determined by the output resolution of the complete image and the number of image portions, processing the complete image by traversing the subject multiple times to create an intermediate image for each image portion, the intermediate image having a greater number of pixels than the image portion, determining each pixel within the image portion by averaging over blocks of pixels in the intermediate image and combining the image portions to generate the complete anti-aliased image with the output resolution.

In other methods which may be implemented with a program storage device, the step of processing may include the steps of performing geometric processing and immediately passing results of the geometric processing to rasterization processing. The step of processing may include the step of adjusting clipping boundaries on each traversal to select blocks of pixels to be processed. The step of processing the image by traversing may include the step of traversing the subject a number of times equal to a predetermined sub-sampling for each pixel determined by the anti-aliasing quality. The subject may include a digital model of one of objects and scenery to be rendered. The step of reproducing the image portions to produce a final anti-aliased image may include the step of generating an anti-aliased image with resolution of m rows and n columns based on rendering the subject to be rendered i×j successive times in which each successive rendering is defined by a contiguous m×n block within the image having i×m rows and j×n columns.

A system for creating anti-aliased images includes a memory storage device for storing a boundary representation of an image. A rendering unit is coupled to the memory storage device for determining addresses and color values of all pixels associated the image. A first image buffer is coupled to the rendering unit to receive results from a multiplicity of rendering passes for blocks of i×j pixels, the first image buffer including a memory with a capacity of at least m×n×p bytes, where m is a number of rows in the image, n is the number of columns in the image, and p is the number of bytes needed to represent each pixel. An image reduction unit is coupled to the first image buffer for determining one pixel in the first image buffer based on an average value for each i×j block of pixels in the first image buffer. A second image buffer is coupled to the image reduction unit having a same size memory capacity as the first image buffer, the second image buffer providing an anti-aliased image after completing the multiplicity of rendering passes.

In alternate embodiments, the memory capacity of the second image buffer is preferably sufficient to produce the anti-aliased image with a same resolution as the image in the second image buffer. The system may further include a frame buffer for producing a visible representation of the anti-aliased image. The frame buffer may include a memory associated with video digital-to-analog converters which produce the visible representation of the image on a display. The frame buffer may have a memory capacity equal to the memory capacity of the second image buffer. The first image buffer may be employed as a frame buffer for producing a visible representation of the anti-aliased image.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to the creation and rendering of electronic images, and more particularly to anti-aliased electronic images provided by a memory efficient system and method. The present invention provides an alternative to the super-image technique and the accumulation buffer technique as described above. Instead of an accumulation buffer with 16 bits per color value, the present invention provides a second image buffer with only 8 bits for each color value. In alternate embodiments, a frame buffer for the present invention may be used as the second image buffer.

Figure 6:
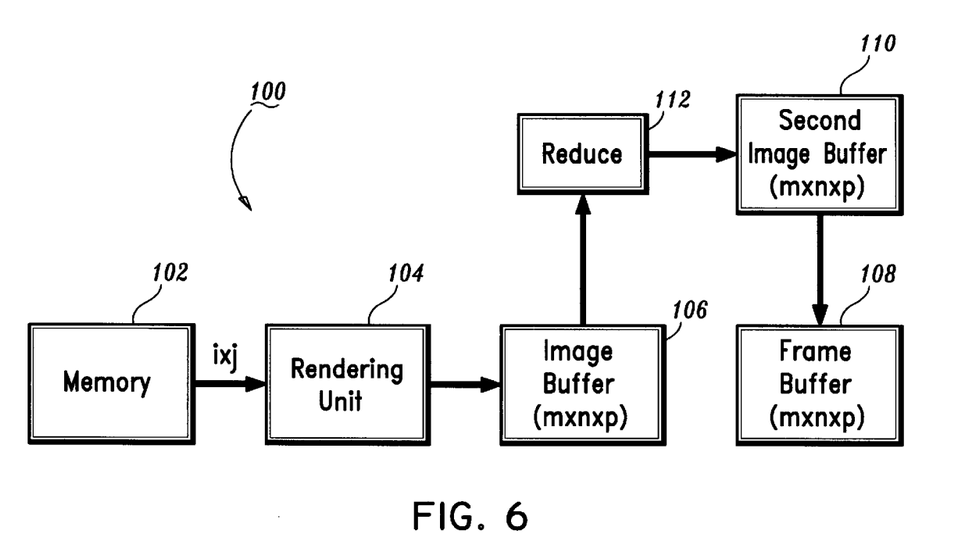
FIG. 6 is a block diagram of an apparatus for creating an anti-aliased image in accordance with the present invention.
Figure 7:
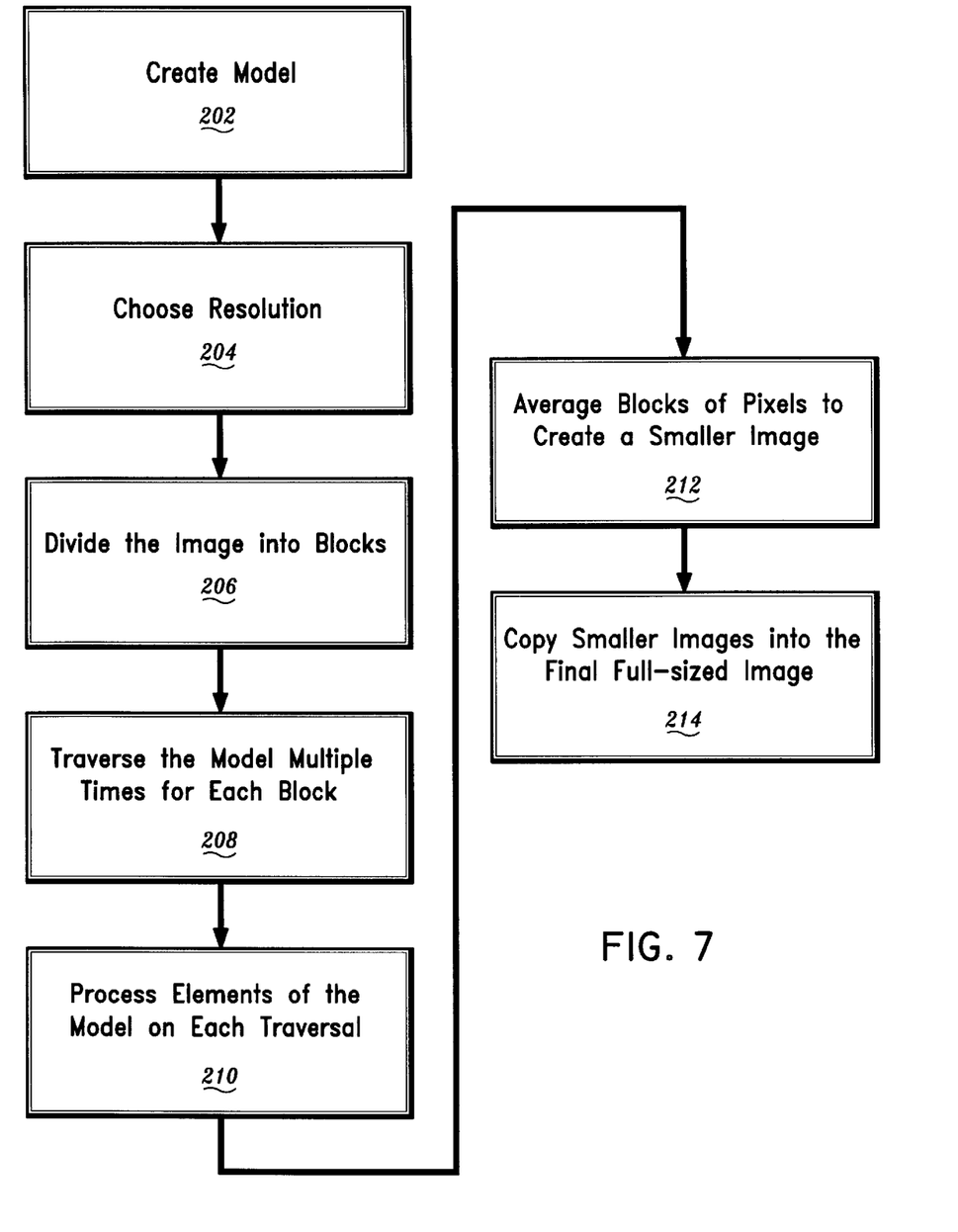
FIG. 7 is a flow diagram showing a method for creating an anti-aliased image in accordance with the present invention.

It should be understood that the elements shown in FIGS. 6–7 may be implemented in various forms of hardware, software or combinations thereof. Preferably, these elements are implemented in a combination of hardware and software on one or more appropriately programmed general purpose digital computers having a processor and memory and input/output interfaces. Referring now to the drawings in which like numerals represent the same or similar elements and initially to FIG. 6, a system 100 for creating an image in accordance with the present invention. System 100 includes a memory 102 for storing a boundary representation of a subject which may include a model or scene or other representations, a rendering unit 104, an image buffer 106, and a frame buffer 108. The rendering unit 104 includes one or more processors capable of determining the addresses and color values of all pixels associated with each component of the scene or model. The image buffer 106 is a memory with a capacity of at least m×n×p bytes, where m is a number of rows in the generated image, n is the number of columns, and p is the number of bytes needed to represent each pixel. The frame buffer 108 may be a special memory associated with video digital-to-analog converters (DACs) which produce a visible representation of the image on, for example, a cathode ray tube (CRT) or other display. The frame buffer 108 may be a data file or other data structure with a capacity of at least m×n×p bytes. In other embodiments, the image buffer 106 and frame buffer 108 may be the same physical memory.

A second image buffer 110 is included which has the same size as the image buffer 106. That is, if the image buffer 106 is based on 8 bits for each color value, then the second buffer 110 needs only 8 bits for each value, not 16 bits as required by the accumulation buffer of the prior art.

The present invention provides a model or scene to be rendered i×j times. Instead of rendering every ith row and jth column of the super-image, an m×n block of contiguous pixels within the super-image is determined on each rendering pass.

After each rendering pass, each i×j sub-block of pixels within the resulting n×m image is averaged to determine one pixel within an (m/i)×(n/j) block in the second buffer 110. This is accomplished by an image reduction unit or reducer 112. The image reduction unit 112 is coupled to an output of image buffer 106 and outputs the reduced image to the second buffer 110. The image reduction unit 112 determines one pixel in the image buffer 106 based on the average value for each i×j block of pixels in the image buffer 106. If m is not a multiple of i or n is not a multiple of j, then the results of two or more passes are combined to determine the values for the pixels on the boundaries of the (m/i)×(n/j) blocks of the second image buffer 110. After completing all i×j rendering passes, the second buffer 110 includes a complete anti-aliased image of the model or scene. Advantageously, in accordance with the invention, the contents of the second buffer 110 may then be copied to the frame buffer 108 with no further processing. In other embodiments, it is also possible to skip the second buffer 110 entirely and update the frame buffer 108 immediately with the results of each rendering pass.

In the case of the conventional accumulation buffer technique, it is necessary to perform i×j rendering passes. The time required by the conventional accumulation buffer technique for each of these passes is approximately equal to the time required to calculate an m×n image without anti-aliasing. These times are nearly equal because every element of the scene or model which is seen in the aliased image is also present in each of the i×j passes required to determine the contents of the accumulation buffer.

For the present invention, however, each of the i×j rendering passes is based on only a small portion of the aliased image. Most of the elements of the model or scene which are included in the aliased image will be outside the portion of the image rendered on any single rendering pass. That is, most elements of a scene or model will be rejected on each pass. Since rejected elements need much less effort than elements which are not rejected, each rendering pass provided by this invention will take much less time than that needed for the aliased image.

Considering an aliased image which needs memory of N bytes and time T seconds. The conventional accumulation buffer technique requires 3M bytes of memory and i×j×T seconds to determine an anti-aliased image equivalent to an i×m by j×n super-image. The present invention needs only 2M bytes of memory with the second image buffer 110, or only M bytes if the second image buffer 110 is not used. The time needed by the present invention may be estimated as (T+i×j×R) where R is the time required to reject the entire scene. Since R is generally much less than T, the time needed by this invention will be much less than that required by the conventional accumulation buffer method. In accordance with the present invention, there is no need for the rendering unit 104 to store a copy of the scene of model, as with the Pixar™ method described above.

Referring now to FIG. 7, a method in accordance with the present invention is shown. In block 202, a subject which may include a digital model of an object(s) or scenery to be rendered is created. This is a collection of geometrical primitives, material properties, light sources, transformation matrices, etc. which define the properties of the object(s) or scenery. In block 204, an output resolution of the image to be generated by the rendering process of the subject is decided (for example, this may be 640×480, 1280×1024, etc.). In block 206, the image defined in block 204 is divided into a small number of large blocks. For example, a 1280× 1024 image may be divided into 4 blocks of 640×512 or 16 blocks of 320×256. The size and number of blocks in this step are directly determined by the anti-aliasing quality, whereas step p3 as described above is not concerned with anti-aliasing. In block 208, the subject is traversed for each block defined in block 206. The traversal is now performed multiple times in accordance with the present invention whereas the traversal is performed only once in the prior art. On each traversal, clipping boundaries are adjusted to select the corresponding block of the image defined in block 204.

In block 210, on each traversal, each element of the subject (model or scene) is processed. That is, the geometry processing is performed and then the results of the geometry processing are immediately passed on to the rasterization processing. The number of traversals is determined by the quality of the anti-aliasing. To obtain 4×4 sub-sampling of each pixel, for example, it would be necessary to traverse the model 16 times. Advantageously, this is fully compatible with standard hardware accelerators for 3d graphics. The image created has the full (or intermediate) resolution of the image defined in block 204, not the smaller size defined in block 206, but the clipping boundaries are set as specified in block 208. In block 212, the image created in block 210 is used to create a smaller image by averaging blocks of pixels from the larger image. For example, if a 1280×1024 image has been divided into 16 blocks of size 320×256, then the image produced in block 210 has a resolution of 1280×1024 which is reduced to 320×256 by averaging the contents of 4×4 blocks of pixels in the larger (1280×1024) image to determine one pixel in the smaller (320×256) image. In block 214, the small images obtained in block 212 are each copied into the corresponding portion of the final full-sized image. The final anti-aliased image is completed after the final traversal of the model and copy of the last block of pixels into the final image.

The present invention provides many traversals. Further, results of geometry processing for each element are immediately sent to be rasterized, nothing is saved. This reduces the need for a large amount of memory and more efficiently uses the available memory. According to the invention, each element is rasterized immediately after geometry processing for that element. The present invention is 3d hardware compatible because rasterization immediately follows geometry processing (i.e.,no deferred rasterization).

Having described preferred embodiments of a memory efficient system and method for creating anti-aliased images (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for creating anti-aliased images comprising the steps of:

providing a subject to be rendered;

defining an output resolution of a complete image to be generated by rendering the subject;

dividing the complete image to be generated into a number of image portions to be generated, the number of the image portions being determined by an anti-aliasing quality, each image portion having a number of pixels determined by the output resolution of the complete image and the number of the image portions;

processing the complete image by traversing the subject multiple times to create an intermediate image for each image portion to be generated, the intermediate image having a greater number of pixels than the image portion;

determining each pixel within the image portion by averaging over blocks of pixels in the intermediate image; and combining the image portions to generate the complete anti-aliased image with the defined output resolution.

2. The method as recited in claim 1, wherein the step of processing includes the steps of:

performing geometric processing; and immediately passing results of the geometric processing to rasterization processing.

3. The method as recited in claim 1, wherein the step of processing includes the step of adjusting clipping boundaries on each traversal to select blocks of pixels to be processed.

4. The method as recited in claim 1, wherein the step of processing the image by traversing includes the step of traversing the subject a number of times equal to a predetermined sub-sampling for pixels determined by the anti-aliasing quality.

5. The method as recited in claim 1, wherein the subject includes a digital model of one of objects and scenery to be rendered.

6. The method as recited in claim 1, wherein the step of combining the image portions comprises the step of generating an anti-aliased image with resolution of m rows and n columns based on rendering the subject to be rendered i×j successive times in which each successive rendering is defined by a contiguous m×n intermediate image within an image space having i×m rows and j×n columns.

7. The method as recited in claim 1, wherein the image portions include a substantially same size.

8. The program storage device as recited in claim 7, wherein the image portions include a substantially same size.

9. The method as recited in claim 1 wherein the intermediate image has a greater resolution than the image portion.

10. A program storage device readable by machine, tangibly embodying a program of instructions executable by the machine to perform method steps for creating anti-aliased images, the method steps comprising:

providing a subject to be rendered;

defining an output resolution of a complete image to be generated by rendering the subject;

dividing the complete image to be generated into a number of image portions to be generated, the number of the image portions being determined by an anti-aliasing quality, each image portion having a number of pixels determined by the output resolution of the complete image and the number of the image portions;

processing the complete image by traversing the subject multiple times to create an intermediate image for each image portion, the intermediate image having a greater number of pixels than the image portion;

determining each pixel within the image portion by averaging over blocks of pixels in the intermediate image; and combining the image portions to generate the complete anti-aliased image with the defined output resolution.

11. The program storage device as recited in claim 10, wherein the step of processing includes the steps of:

performing geometric processing; and immediately passing results of the geometric processing to rasterization processing.

12. The program storage device as recited in claim 10, wherein the step of processing includes the step of adjusting clipping boundaries on each traversal to select blocks of pixels to be processed.

13. The program storage device as recited in claim 10, wherein the step of processing the image by traversing includes the step of traversing the subject a number of times equal to a predetermined sub-sampling for pixels determined by the anti-aliasing quality.

14. The program storage device as recited in claim 10, wherein the subject includes a digital model of one of objects and scenery to be rendered.

15. The program storage device as recited in claim 10, wherein the step of combining the image portions comprises the step of generating an anti-aliased image with resolution of m rows and n columns based on rendering the subject i×j successive times in which each successive rendering is defined by a contiguous m×n intermediate image within an image space having i×m rows and j×n columns.

16. The program storage device as recited in claim 10, wherein the intermediate image has a greater resolution than the image portion.

17. A system for creating anti-aliased images comprising:

a memory storage device for storing a boundary representation of an image;

a rendering unit coupled to the memory storage device for determining addresses and color values of all pixels associated the image;

a first image buffer coupled to the rendering unit to receive results from a multiplicity of rendering passes for blocks of i×j pixels, the first image buffer including a memory with a capacity of at least m×n×p bytes, where m is a number of rows in the image, n is the number of columns in the image, and p is the number of bytes needed to represent each pixel;

an image reduction unit coupled to the first image buffer for determining at least one pixel based on an average value for each i×j block of pixels in the first image buffer; and a second image buffer coupled to the image reduction unit for receiving each determined pixel, the second image buffer providing an anti-aliased image after completing the multiplicity of rendering passes.

18. The system as recited in claim 17, wherein the memory capacity of the second image buffer is only sufficient to produce the anti-aliased image with a resolution less than the resolution of the transformed image portion in the first image buffer.

19. The system as recited in claim 17, further comprising a frame buffer for producing a visible representation of the anti-aliased image.

20. The system as recited in claim 19, wherein the frame buffer includes a memory associated with video digital-to-analog converters, which produce the visible representation of the image on a display.

21. The system as recited in claim 19, wherein the frame buffer has a memory capacity substantially equal to the memory capacity of the second image buffer.

22. The system as recited in claim 17, wherein the first image buffer is employed as a frame buffer for producing a visible representation of the anti-aliased image.

23. The system as recited in claim 17, wherein the second image buffer has a memory capacity substantially equal to the memory capacity of the first image buffer.

* * * * *